(12) United States Patent
Sun et al.

(10) Patent No.: US 10,925,048 B2
(45) Date of Patent: Feb. 16, 2021

(54) CONTROL RESOURCE SET FOR SINGLE-CARRIER WAVEFORM

(71) Applicant: QUALCOMM Incorporated, San Diego, CA (US)

(72) Inventors: Jing Sun, San Diego, CA (US); Tao Luo, San Diego, CA (US); Sony Akkarakaran, Poway, CA (US); Rahul Malik, San Diego, CA (US); Akula Reddy, San Diego, CA (US); Tamer Kadous, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 15/910,615

(22) Filed: Mar. 2, 2018

(65) Prior Publication Data

US 2018/0288749 A1 Oct. 4, 2018

Related U.S. Application Data

(60) Provisional application No. 62/479,055, filed on Mar. 30, 2017.

(51) Int. Cl.
*H04L 5/00* (2006.01)
*H04W 72/04* (2009.01)

(52) U.S. Cl.
CPC ......... *H04W 72/042* (2013.01); *H04L 5/0048* (2013.01); *H04L 5/0053* (2013.01); *H04L 5/0005* (2013.01); *H04L 5/0051* (2013.01)

(58) Field of Classification Search
CPC combination set(s) only.
See application file for complete search history.

(56) References Cited

U.S. PATENT DOCUMENTS

| | | | |
|---|---|---|---|
| 2009/0180459 A1* | 7/2009 | Orlik | H04L 5/0007 370/344 |
| 2012/0069815 A1* | 3/2012 | Aiba | H04L 1/1664 370/329 |
| 2017/0135084 A1* | 5/2017 | Kuchibhotla | H04L 5/0007 |
| 2018/0007673 A1* | 1/2018 | Fwu | H04W 4/70 |
| 2018/0145818 A1* | 5/2018 | Choi | H04L 5/0051 |
| 2018/0192383 A1* | 7/2018 | Nam | H04L 5/0053 |
| 2018/0279135 A1* | 9/2018 | Hwang | H04L 1/1861 |

(Continued)

OTHER PUBLICATIONS

Samsung, "Considerations for flexible bandwidth in NR", Apr. 2017, 3GPP R2-1703451.*

(Continued)

*Primary Examiner* — Lakeram Jangbahadur
(74) *Attorney, Agent, or Firm* — Patterson + Sheridan, LLP

(57) ABSTRACT

Certain aspects of the present disclosure relate to communication systems, and more particularly, to a control resource set (coreset) for transmitting physical downlink control channels using a single-carrier waveform in communications systems operating according to new radio (NR) technologies. In an exemplary method, a base station may determine a first control resource set (coreset) of time and frequency resources within a control region of system bandwidth, to transmit a physical downlink control channel (PDCCH) to a user equipment (UE) and transmit the PDCCH to the UE as a single-carrier waveform via the first coreset of time and frequency resources.

28 Claims, 11 Drawing Sheets

(56) References Cited

U.S. PATENT DOCUMENTS

2018/0368122 A1\* 12/2018 Kuchibhotla ....... H04W 72/085
2019/0238382 A1\* 8/2019 Baldemair ............ H04L 5/0048
2019/0357204 A1\* 11/2019 Matsumura ........... H04W 72/04

OTHER PUBLICATIONS

Ericsson: "On the Design of 2-Symbol Short PUCCH," 3GPP Draft; R1-1706037, 3rd Generation Partnership Project (3GPP), Mobile Competence Centre; 650, Route Des Lucioles; F-06921 Sophia-Antipolis Cedex; France, vol. RAN WG1, No. Spokane, US; Apr. 3, 2017-Apr. 7, 2017, Mar. 25, 2017, XP051252296, 4 pages, Retrieved from the Internet: URL: http://www.3gpp.org/ftp/tsg_ran/WG1_RL1/TSGR1_88b/Docs/ [retrieved on Mar. 25, 2017].

International Search Report and Written Opinion—PCT/US2018/020804—ISA/EPO—dated Jun. 13, 2018.

Samsung: "DMRS Structure for NR-PDCCH," 3GPP Draft; R1-1705375 DMRS Structure for NR-PDCCH, 3rd Generation Partnership Project (3GPP), Mobile Competence Centre; 650, Route Des Lucioles; F-06921, Sophia-Antipolis Cedex; France, vol. RAN WG1, No. Spokane, USA; Apr. 3, 2017-Apr. 7, 2017, Mar. 25, 2017, XP051251894, 6 pages, Retrieved from the Internet: URL: http://www.3gpp.org/ftp/tsg_ran/WG1_RL1/TSGR1_88b/Docs/ [retrieved on Mar. 25, 2017].

Samsung: "Resource Mapping Aspects for NR-PDCCH," 3GPP Draft; R1-1705376 Resource Mapping for NR-PDCCH, 3rd Generation Partnership Project (3GPP), Mobile Competence Centre; 650, Route Des Lucioles; F-06921, Sophia-Antipolis Cedex; France, vol. RAN WG1, No. Spokane, USA; Apr. 3, 2017-Apr. 7, 2017, Mar. 24, 2017, XP051250676, 6 pages, Retrieved from the Internet: URL: http://www.3gpp.org/ftp/tsg_ran/WG1_RL1/TSGR1_88b/Docs/ [retrieved on Mar. 24, 2017].

\* cited by examiner

CONTROL RESOURCE SET FOR SINGLE-CARRIER WAVEFORM

CROSS-REFERENCE TO RELATED APPLICATIONS

The present Application for Patent claims priority to U.S. Provisional Application No. 62/479,055, filed Mar. 30, 2017, which is assigned to the assignee of the present application and hereby expressly incorporated by reference herein in its entirety.

FIELD

The present disclosure relates generally to communication systems, and more particularly, to a control resource set (coreset) for transmitting physical downlink control channels using a single-carrier waveform in communications systems operating according to new radio (NR) technologies.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, eNB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a need for further improvements in NR technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure generally relate to control resource sets (coresets) for systems transmitting using single-carrier waveforms. One or more coresets may be defined in a wider system bandwidth and used for transmitting physical downlink control channels (PDCCHs) to one or more user equipments (UEs).

Certain aspects provide a method for wireless communication by a base station (BS). The method generally includes determining a first control resource set (coreset) of time and frequency resources within a control region of system bandwidth, to transmit a physical downlink control channel (PDCCH) to a user equipment (UE) and transmitting the PDCCH to the UE as a single-carrier waveform via the first coreset of time and frequency resources.

Certain aspects provide a method for wireless communication by a user equipment (UE). The method generally includes determining a first control resource set (coreset) of time and frequency resources within a control region of system bandwidth, to receive a physical downlink control channel (PDCCH) from a base station (BS) and receiving the PDCCH as a single-carrier waveform via the first coreset of time and frequency resources.

Certain aspects provide an apparatus for wireless communications. The apparatus generally includes a processor configured to determine a first control resource set (coreset) of time and frequency resources within a control region of system bandwidth, to transmit a physical downlink control channel (PDCCH) to a user equipment (UE), to cause the apparatus to transmit the PDCCH to the UE as a single-carrier waveform via the first coreset of time and frequency resources, and a memory coupled with the processor.

Certain aspects provide an apparatus for wireless communications. The apparatus generally includes a processor configured to determine a first control resource set (coreset) of time and frequency resources within a control region of system bandwidth, to receive a physical downlink control channel (PDCCH) from a base station (BS), to cause the apparatus to receive the PDCCH as a single-carrier waveform via the first coreset of time and frequency resources, and a memory coupled with the processor.

Certain aspects provide an apparatus for wireless communications. The apparatus generally includes means for determining a first control resource set (coreset) of time and frequency resources within a control region of system bandwidth, to transmit a physical downlink control channel (PDCCH) to a user equipment (UE) and means for transmitting the PDCCH to the UE as a single-carrier waveform via the first coreset of time and frequency resources.

Certain aspects provide an apparatus for wireless communications. The apparatus generally includes means for determining a first control resource set (coreset) of time and frequency resources within a control region of system bandwidth, to receive a physical downlink control channel (PDCCH) from a base station (BS) and means for receiving the PDCCH as a single-carrier waveform via the first coreset of time and frequency resources Certain aspects provide a computer-readable medium for wireless communications. The computer-readable medium includes instructions that, when executed by a processing system, cause the processing system to perform operations generally including determining a first control resource set (coreset) of time and frequency resources within a control region of system bandwidth, to transmit a physical downlink control channel (PDCCH) to a user equipment (UE) and transmitting the PDCCH to the UE as a single-carrier waveform via the first coreset of time and frequency resources.

Certain aspects provide a computer-readable medium for wireless communications. The computer-readable medium includes instructions that, when executed by a processing system, cause the processing system to perform operations generally including determining a first control resource set (coreset) of time and frequency resources within a control region of system bandwidth, to receive a physical downlink control channel (PDCCH) from a base station (BS) and receiving the PDCCH as a single-carrier waveform via the first coreset of time and frequency resources.

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
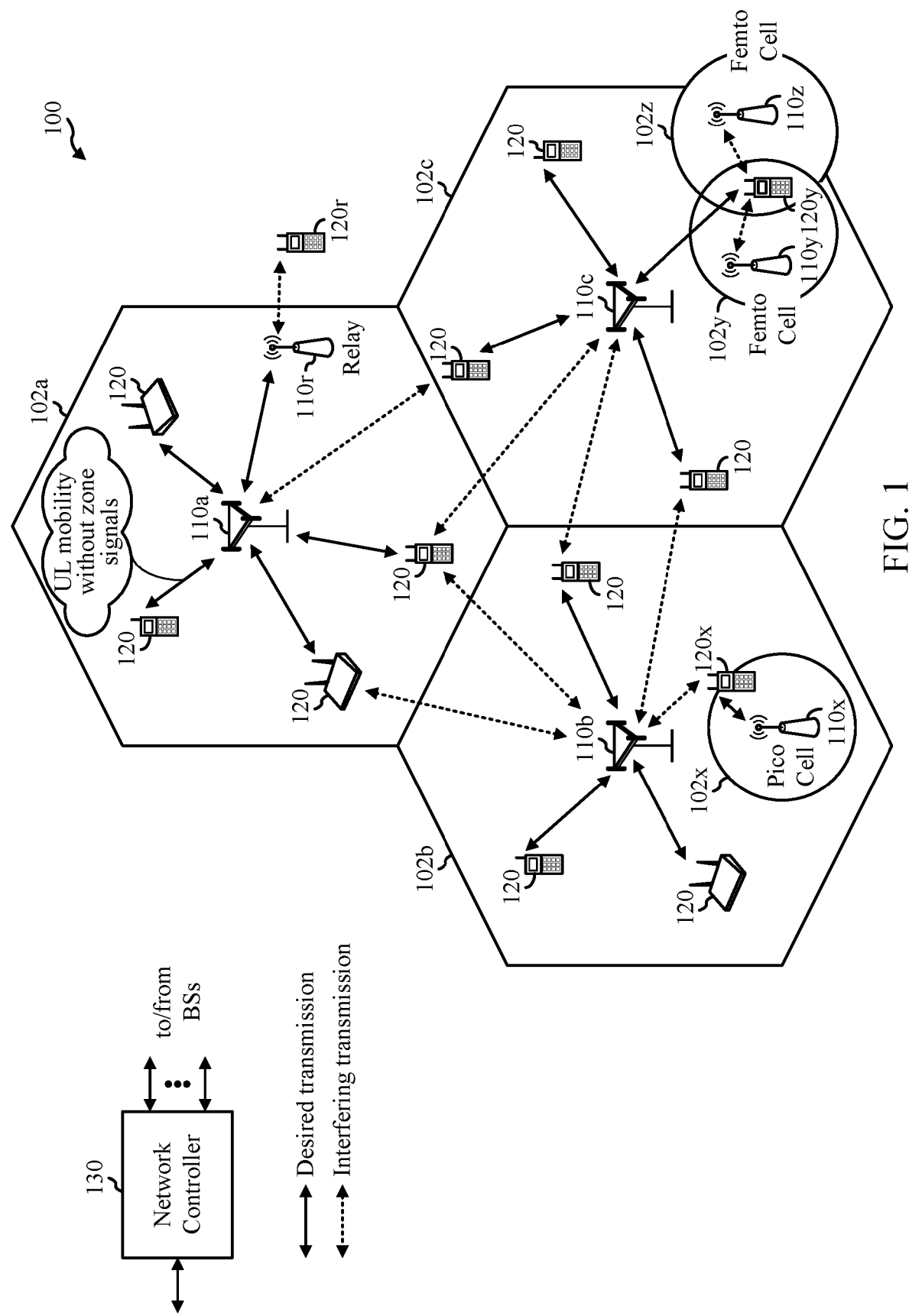
FIG. 1 is a block diagram conceptually illustrating an example telecommunications system, in accordance with certain aspects of the present disclosure.

In communications systems operating according to millimeter-wave (mmW) new radio (NR) (e.g., 5G) standards, single-carrier waveforms, in addition to OFDMA waveforms, may be used by devices to extend the DL link budget. That is, use of a single-carrier waveform may improve power levels of received downlink signals at receiving devices. The single-carrier waveform may allow a lower peak-to-average-power ratio (PAPR) of the signal, which may allow a power amplifier (PA) of a transmit chain to use a higher transmit power level. Discrete Fourier transform single carrier frequency domain multiple access (DFT-S-FDMA) is one type of single-carrier waveform that may be used for downlink signals.

NR may support various wireless communication services, such as Enhanced mobile broadband (eMBB) targeting wide bandwidth (e.g., 80 MHz and wider), millimeter wave (mmW) targeting high carrier frequency (e.g., 27 GHz and higher), massive machine-type communications (mMTC) targeting non-backward compatible machine-type communications (MTC) techniques, and/or mission critical targeting ultra-reliable low latency communications (URLLC). These services may include latency and reliability requirements. These services may also have different transmission time intervals (TTI) to meet respective quality of service (QoS) requirements. In addition, these services may co-exist in the same subframe.

Aspects of the present disclosure relate to transmitting physical downlink control channels (PDCCHs) using single-carrier waveforms, such as DFT-S-FDMA.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100, such as a new radio (NR) or 5G network, in which aspects of the present disclosure may be performed, for example, for enabling connectivity sessions and internet protocol (IP) establishment, as described in greater detail below.

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and eNB, Node B, 5G NB, AP, NR BS, NR BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may be coupled to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using time division duplex (TDD). A single component carrier bandwidth of 100 MHz may be supported. NR resource blocks may span 12 sub-carriers with a sub-carrier bandwidth of 75 kHz over a 0.1 ms duration. Each radio frame may consist of 2 half frames, each half frame consisting of 5 subframes, with a length of 10 ms. Consequently, each subframe may have a length of 1 ms. Each subframe may indicate a link direction (i.e., DL or UL) for data transmission and the link direction for each subframe may be dynamically switched. Each subframe may include DU/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., eNB, 5G Node B, Node B, transmission reception point (TRP), access point (AP)) may correspond to one or multiple BSs. NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
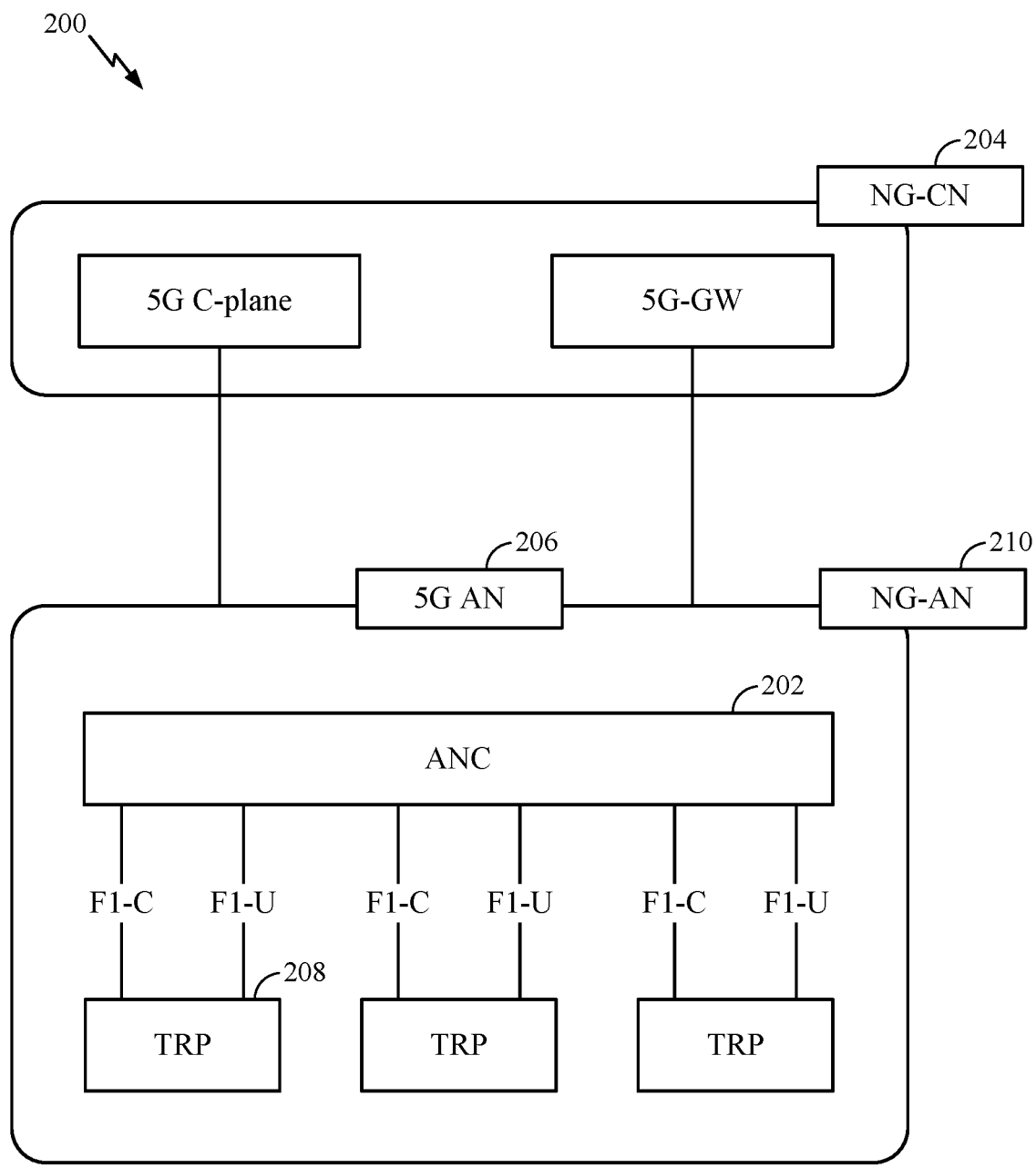
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed and/or present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
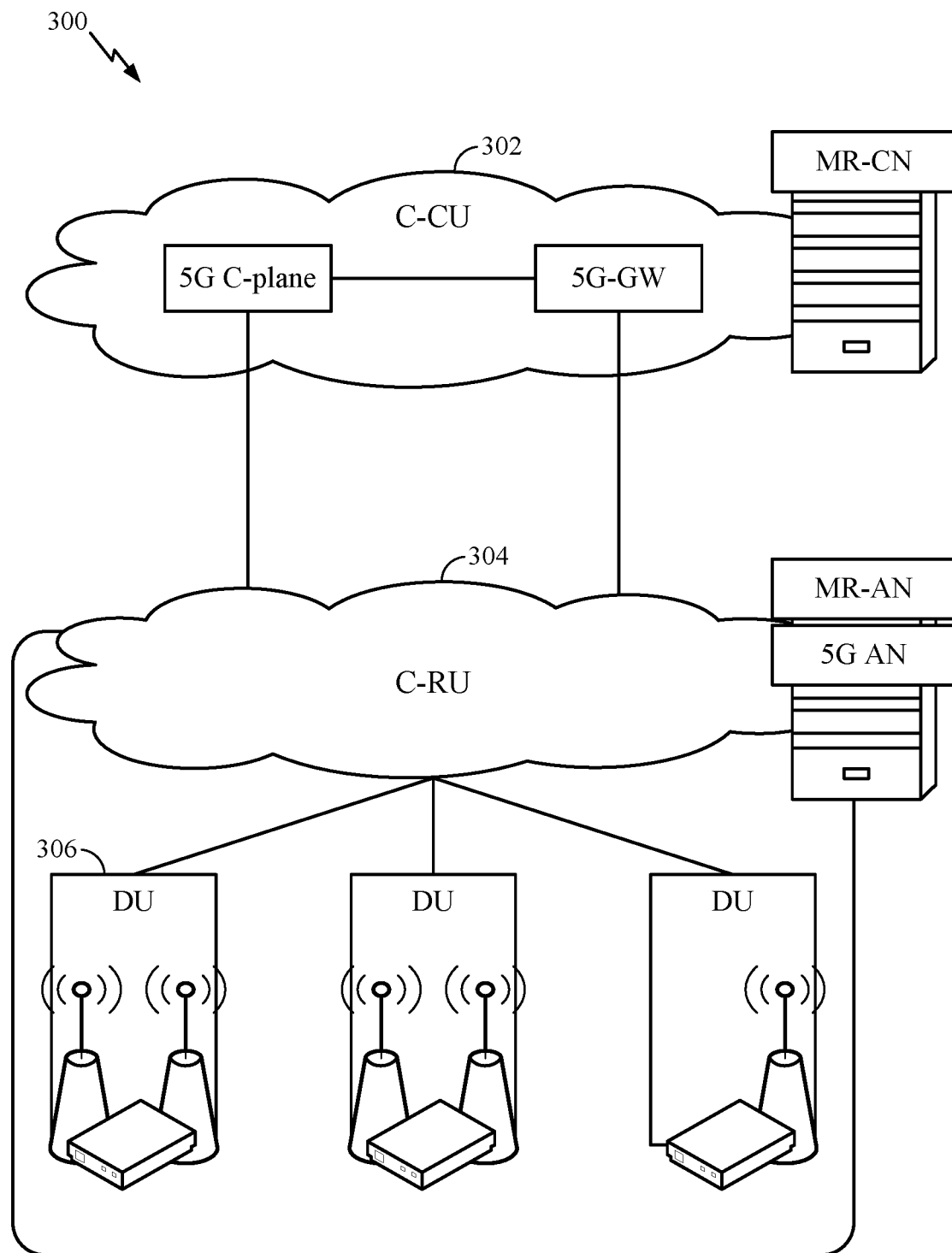
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
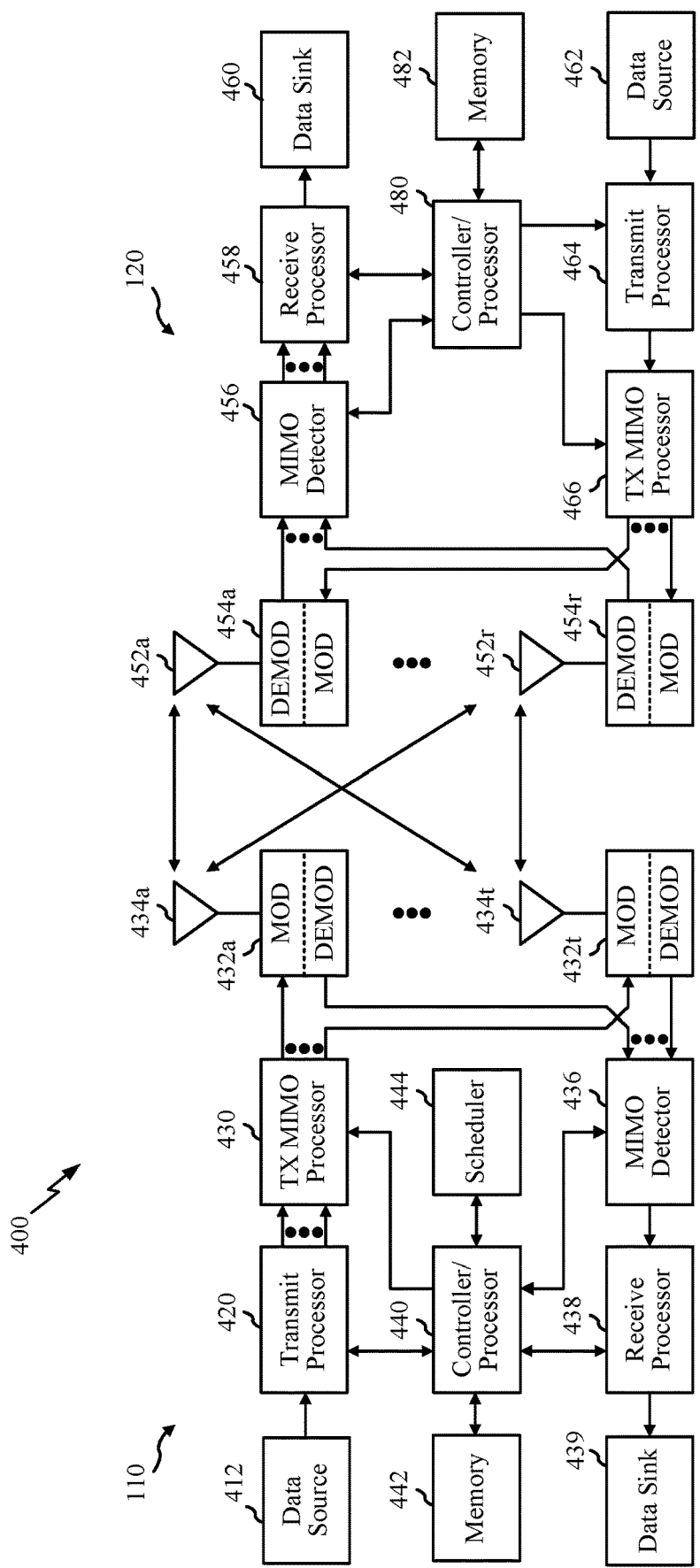
FIG. 4 is a block diagram conceptually illustrating a design of an example BS and user equipment (UE), in accordance with certain aspects of the present disclosure.

FIG. 4 illustrates example components of the BS 110 and UE 120 illustrated in FIG. 1, which may be used to implement aspects of the present disclosure. As described above, the BS may include a TRP. One or more components of the BS 110 and UE 120 may be used to practice aspects of the present disclosure. For example, antennas 452, Tx/Rx 222, processors 466, 458, 464, and/or controller/processor 480 of the UE 120 and/or antennas 434, processors 460, 420, 438, and/or controller/processor 440 of the BS 110 may be used to perform the operations described herein and illustrated with reference to FIGS. 9-10.

FIG. 4 shows a block diagram of a design of a BS 110 and a UE 120, which may be one of the BSs and one of the UEs in FIG. 1. For a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. For example, the TX MIMO processor 430 may perform certain aspects described herein for RS multiplexing. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. For example, MIMO detector 456 may provide detected RS transmitted using techniques described herein. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454*a* through 454*r* (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct, e.g., the execution of the functional blocks illustrated in FIG. 9, and/or other processes for the techniques described herein. The processor 480 and/or other processors and modules at the UE 120 may also perform or direct processes for the techniques described herein. The memories 442 and 482 may store data and program codes for the BS 110 and the UE 120, respectively. A scheduler 444 may schedule UEs for data transmission on the downlink and/or uplink.

Figure 5:
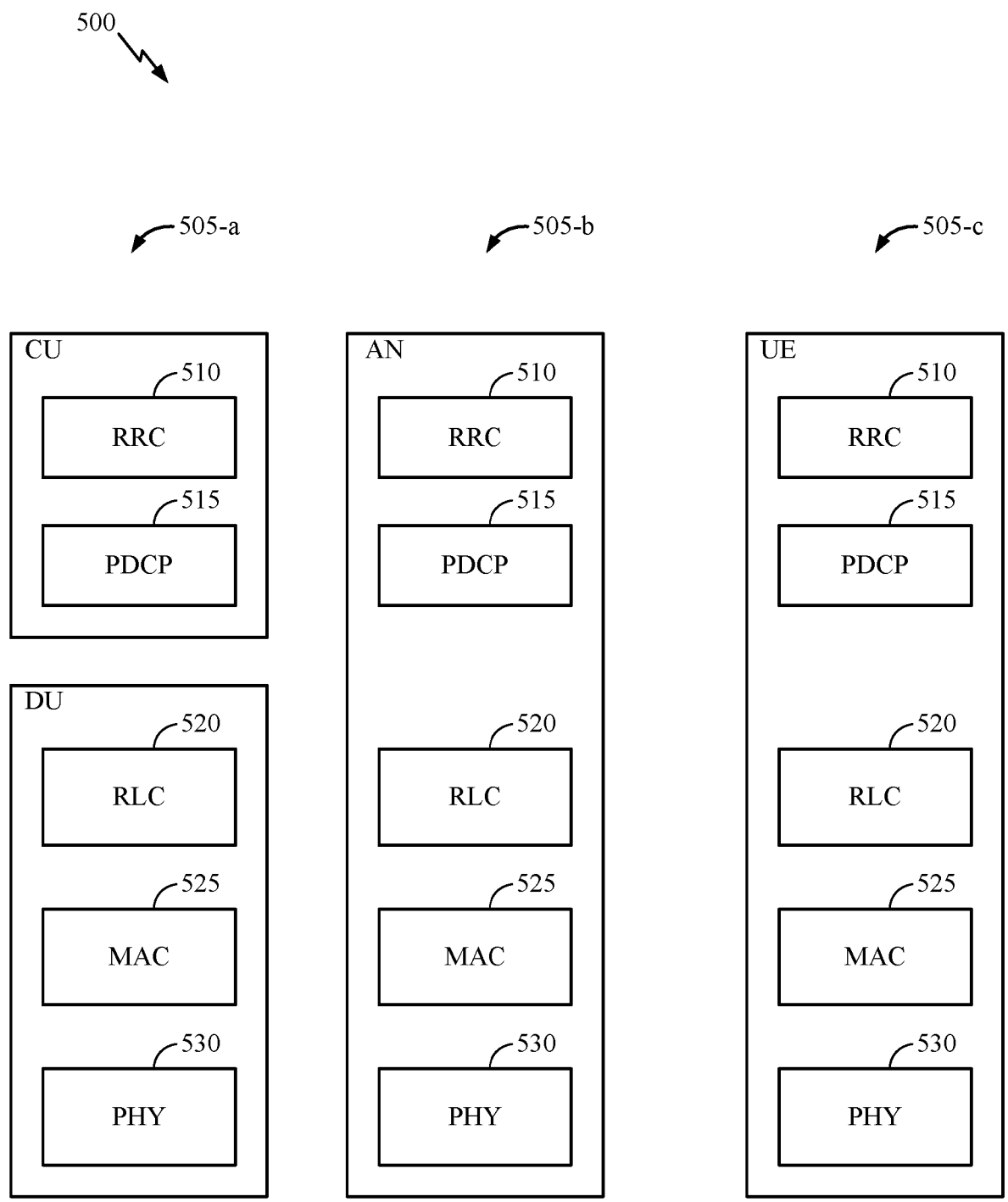
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-*a* shows a split implementation of a protocol stack, in which implementation of the protocol stack is split between a centralized network access device (e.g., an ANC 202 in FIG. 2) and distributed network access device (e.g., DU 208 in FIG. 2). In the first option 505-*a*, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-*a* may be useful in a macro cell, micro cell, or pico cell deployment.

A second option 505-*b* shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-*b* may be useful in a femto cell deployment.

Regardless of whether a network access device implements part or all of a protocol stack, a UE may implement an entire protocol stack 505-*c* (e.g., the RRC layer 510, the PDCP layer 515, the RLC layer 520, the MAC layer 525, and the PHY layer 530).

Figure 6:
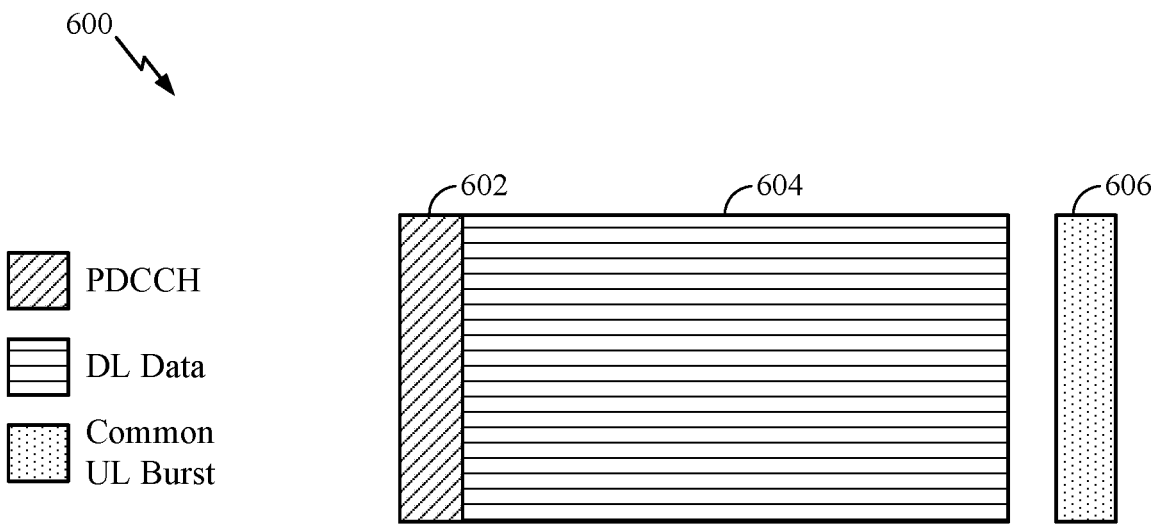
FIG. 6 illustrates an example of a DL-centric subframe, in accordance with certain aspects of the present disclosure.

FIG. 6 is a diagram 600 showing an example of a DL-centric subframe. The DL-centric subframe may include a control portion 602. The control portion 602 may exist in the initial or beginning portion of the DL-centric subframe. The control portion 602 may include various scheduling information and/or control information corresponding to various portions of the DL-centric subframe. In some configurations, the control portion 602 may be a physical DL control channel (PDCCH), as indicated in FIG. 6. The DL-centric subframe may also include a DL data portion 604. The DL data portion 604 may sometimes be referred to as the payload of the DL-centric subframe. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 7:
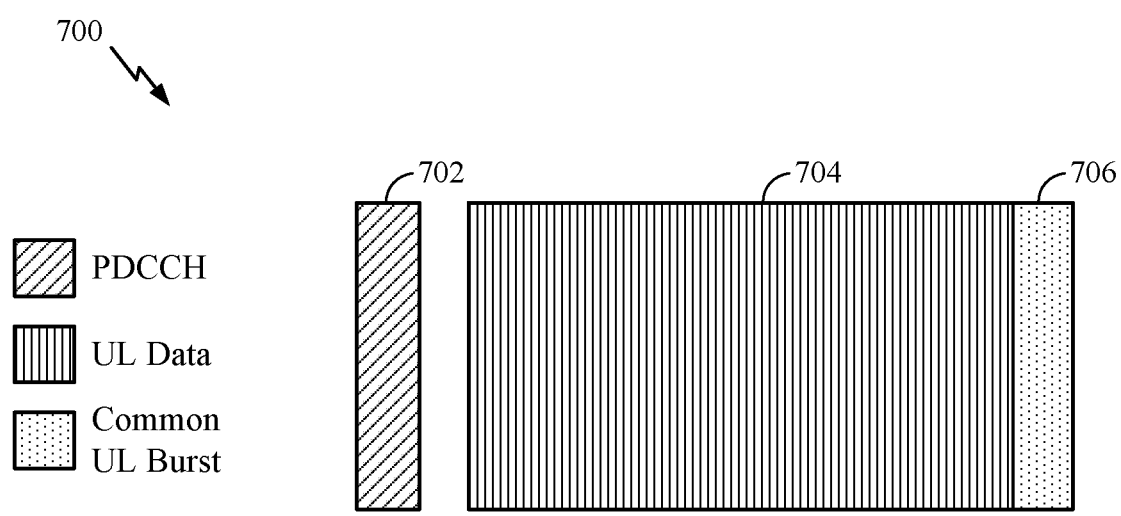
FIG. 7 illustrates an example of an UL-centric subframe, in accordance with certain aspects of the present disclosure.

FIG. 7 is a diagram 700 showing an example of an UL-centric subframe. The UL-centric subframe may include a control portion 702. The control portion 702 may exist in the initial or beginning portion of the UL-centric subframe. The control portion 702 in FIG. 7 may be similar to the control portion described above with reference to FIG. 6. The UL-centric subframe may also include an UL data portion 704. The UL data portion 704 may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 702 may be a physical DL control channel (PDCCH).

As illustrated in FIG. 7, the end of the control portion 702 may be separated in time from the beginning of the UL data portion 704. This time separation may sometimes be referred to as a gap, guard period, guard interval, and/or various other suitable terms. This separation provides time for the switchover from DL communication (e.g., reception operation by the scheduling entity) to UL communication (e.g., transmission by the scheduling entity). The UL-centric subframe may also include a common UL portion 706. The common UL portion 706 in FIG. 7 may be similar to the common UL portion 706 described above with reference to FIG. 7. The common UL portion 706 may additional or alternative include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Control Resource Set for Single-Carrier Waveform

In communications systems operating according to millimeter-wave (mmW) new radio (NR) (e.g., 5G) standards, single-carrier waveforms, in addition to OFDMA waveforms, may be used by devices to extend the DL link budget. That is, use of a single-carrier waveform may improve power levels of received downlink signals at receiving devices. The single-carrier waveform may allow a lower peak-to-average-power ratio (PAPR) of the signal, which may allow a power amplifier (PA) of a transmit chain to use a higher transmit power level. Discrete Fourier transform single carrier frequency domain multiple access (DFT-S-FDMA) is one type of single-carrier waveform that may be used for downlink signals.

According to aspects of the present disclosure, a single-carrier waveform designed for transmitting PDSCH may be also be used for transmitting PDCCH. Using a waveform that UEs are already capable of receiving (e.g., single-carrier waveforms designed for transmitting PDSCH) may be advantageous over designing a different waveform for transmitting PDCCH, because UE receivers may receive the single carrier PDCCHs with the same receive chain components the UE receivers use in receiving single carrier PDSCHs.

In aspects of the present disclosure, a control resource set (coreset) for an OFDMA system (e.g., a communications system transmitting PDCCH using OFDMA waveforms) may comprise one or more control resource (e.g., time and frequency resources) sets, configured for conveying PDCCH, within the system bandwidth. Within each coreset, one or more search spaces (e.g., common search space (CSS), UE-specific search space (USS)) may be defined for a given UE.

According to aspects of the present disclosure, a coreset is a set of time and frequency domain resources, defined in units of resource element groups (REGs). Each REG may comprise a fixed number (e.g., twelve) tones in one symbol period (e.g., a symbol period of a slot), where one tone in one symbol period is referred to as a resource element (RE). A fixed number of REGs may be included in a control channel element (CCE). Sets of CCEs may be used to transmit new radio PDCCHs (NR-PDCCHs), with different numbers of CCEs in the sets used to transmit NR-PDCCHs using differing aggregation levels. Multiple sets of CCEs may be defined as search spaces for UEs, and thus a NodeB or other base station may transmit an NR-PDCCH to a UE by transmitting the NR-PDCCH in a set of CCEs that is defined as a decoding candidate within a search space for the UE, and the UE may receive the NR-PDCCH by searching in search spaces for the UE and decoding the NR-PDCCH transmitted by the NodeB.

In aspects of the present disclosure, a NodeB may use different techniques of forming CCEs from REGs and mapping NR-PDCCHs to CCEs for different UEs, thus allowing multiple options for transmitting NR-PDCCHs to multiple UEs in one coreset.

According to aspects of the present disclosure, mapping of an OFDMA NR-PDCCH to CCEs in frequency domain may use a localized or distributed approach. That is, an NR-PDCCH may be mapped to a set of adjacent tones (localized approach) or spread across tones that are not adjacent in a bandwidth (distributed approach).

In aspects of the present disclosure, a demodulation reference signal (DMRS) may be associated with an NR-PDCCH transmitted using non-single-carrier waveforms, such as OFDMA. The DMRS may be used in determining channel state by a device receiving the NR-PDCCH, and the device may use the channel state in receiving, demodulating, and/or decoding the NR-PDCCH. The DMRS may be embedded in the NR-PDCCH or transmitted as a wideband signal in the coreset. If the DMRS is embedded in the NR-PDCCH, then some CCEs used in transmitting the NR-PDCCH are used to transmit the embedded DMRS, reducing the total quantity of control data conveyed by the CCEs used in transmitting the NR-PDCCH. If the DMRS is transmitted as a wideband signal, then CCEs used to transmit an NR-PDCCH may all convey control data, because none are used to transmit an embedded DMRS.

Figure 8:
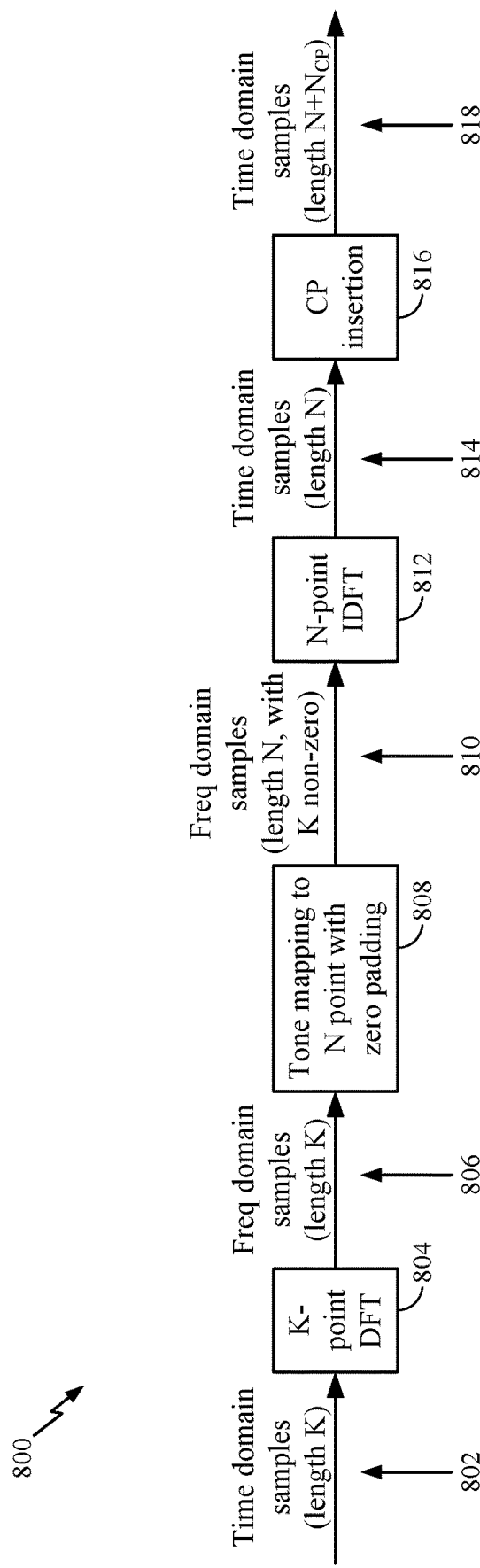
FIG. 8 illustrates example operations for wireless communications, in accordance with certain aspects of the present disclosure.

FIG. 8 illustrates example operations 800 for generating a discrete Fourier transform single carrier frequency domain multiplexing (DFT-S-FDM) waveform signal, such as a PDCCH transmitted using a DFT-S-FDM waveform. The operations 800 may be performed by one or more of the controller/processor 440, transmit processor 420, and/or TX MIMO processor 430, shown in FIG. 4. Operations 800 begin by obtaining K time domain samples 802 representing data (e.g., control data of a PDCCH) to be transmitted. The K time domain samples may be obtained from a data source 412 or from the controller/processor 440. The K time domain samples are processed through a K-point discrete Fourier transform (DFT) at 804 to generate K frequency domain samples 806. The K-point DFT may be performed by the controller/processor 440 and/or the transmit processor 420. The K frequency domain samples 806 are combined with N−K zeroes (e.g., zero padding) and mapped at 808 to N tones to generate N frequency domain samples 810. The mapping to the N tones may be performed by the transmit processor 420. The N frequency domain samples may be processed through an N-point inverse discrete Fourier transform (IDFT) at 812 to generate N time domain samples 814. The IDFT may be performed by the transmit processor 420. A cyclic prefix (CP) of length $N_{CP}$ may be formed by copying $N_{CP}$ time domain samples from the end of the N time domain samples and inserting those $N_{CP}$ time domain samples at the beginning of the N time domain samples to generate $N+N_{CP}$ time domain samples 818. The $N+N_{CP}$ time domain samples 818 may then be transmitted, e.g., via CCEs included in a search space of a UE that is an intended recipient of the transmission.

Figure 9:
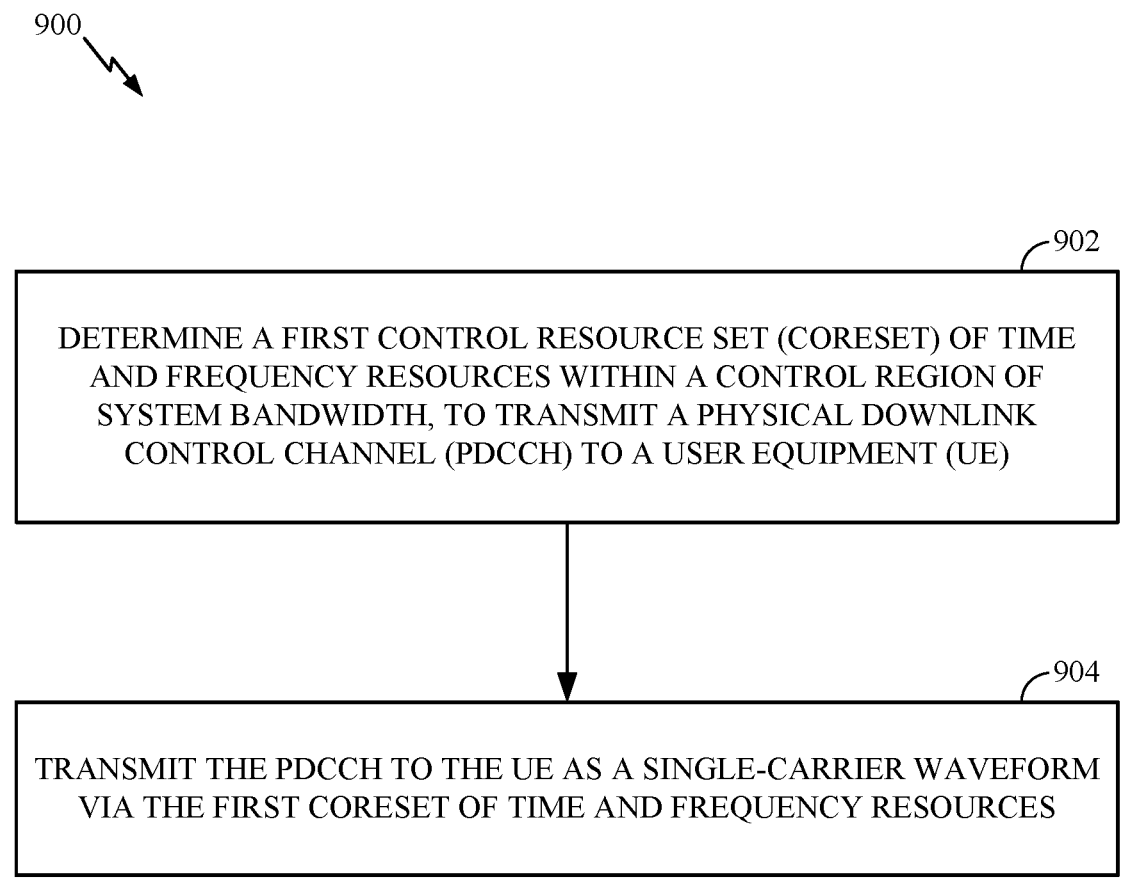
FIG. 9 example operations for wireless communications, in accordance with aspects of the present disclosure.

FIG. 9 illustrates example operations 900 for wireless communications, in accordance with aspects of the present disclosure. Operations 900 may be performed by a BS, for example, BS 110, shown in FIG. 1.

Operations 900 begin, at block 902, with the BS determining a first control resource set (coreset) of time and frequency resources within a control region of system bandwidth, to transmit a physical downlink control channel (PDCCH) to a user equipment (UE). For example, BS 110 determines a first coreset within a control region (e.g., frequency resources 1106, shown in FIG. 11) of system bandwidth (e.g., system bandwidth 1102, shown in FIG. 11) to transmit a PDCCH to UE 120.

At block 904, operations 900 continue with the BS transmitting the PDCCH to the UE as a single-carrier waveform via the first coreset of time and frequency resources. Continuing the example from above, BS 110 transmits the PDCCH to UE 120 as a single-carrier waveform (e.g., a DFT-S-FDMA waveform) via the first coreset of time and frequency resources.

Figure 10:
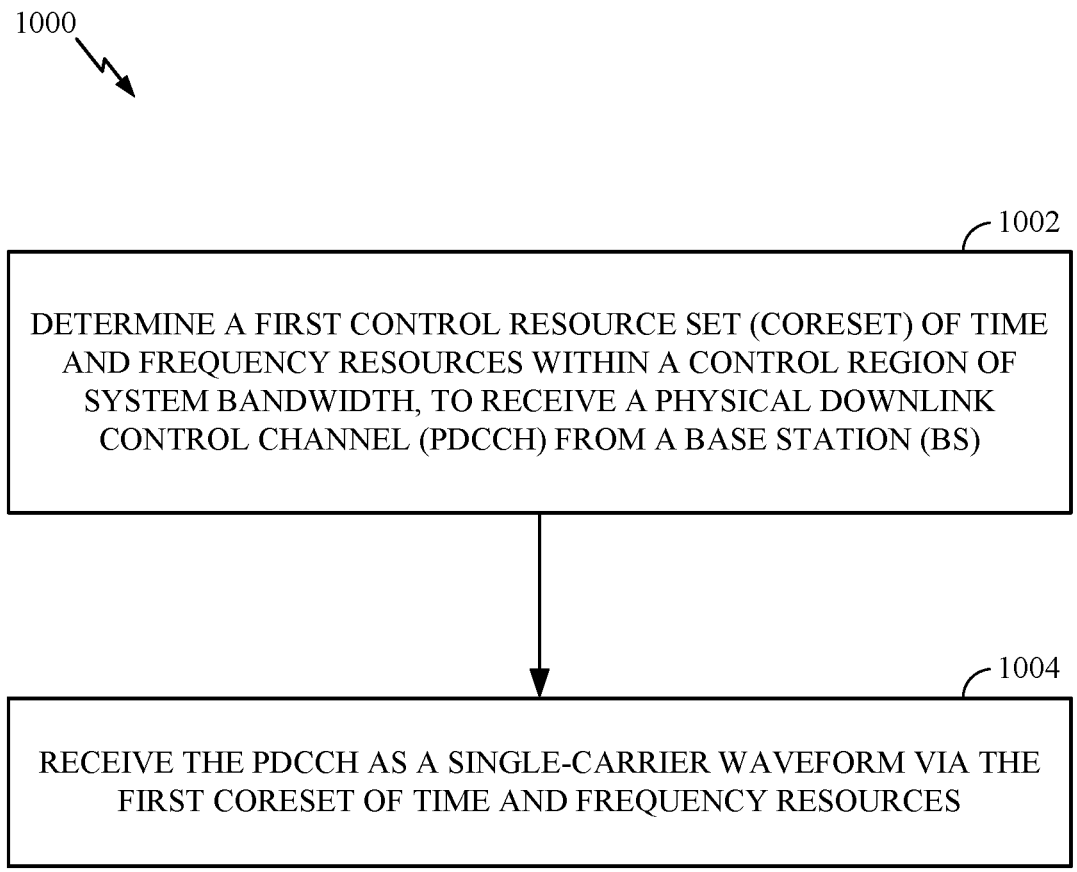
FIG. 10 illustrates a technique for multiplexing SRSs using different waveforms in frequency, in accordance with certain aspects of the present disclosure.

FIG. 10 illustrates example operations 1000 for wireless communications, in accordance with aspects of the present disclosure. Operations 1000 may be performed by a UE, for example, UE 120, shown in FIG. 1. Operations 1000 may be complementary to operations 900, shown in FIG. 9.

Operations 1000 begin, at block 1002, with the UE determining a first control resource set (coreset) of time and frequency resources within a control region of system bandwidth, to receive a physical downlink control channel (PDCCH) from a base station (BS). For example, UE 120 determines a first coreset within a control region (e.g., frequency resources 1106, shown in FIG. 11) of system bandwidth (e.g., system bandwidth 1102, shown in FIG. 11) to receive a PDCCH from BS 110.

At block 1004, operations 1000 continue with the UE receiving the PDCCH as a single-carrier waveform via the first coreset of time and frequency resources. Continuing the example from above, UE 120 receives the PDCCH as a single-carrier waveform (e.g., a DFT-S-FDMA waveform) via the first coreset of time and frequency resources.

According to aspects of the present disclosure, a control resource set (coreset) for a communications system transmitting control channels via a single-carrier waveform may be limited in time and frequency, e.g., a coreset can be less than a system bandwidth of the communications system.

In aspects of the present disclosure, a BS (e.g., a NodeB, an eNodeB) may transmit an indication of time and frequency resources of a coreset via a master information block (MIB) and/or via a radio resource control (RRC) configuration.

According to aspects of the present disclosure, a UE may obtain an indication of time and frequency resources of a core set from a master information block (MIB) and/or a radio resource control (RRC) configuration transmitted by a BS serving the UE.

In aspects of the present disclosure a DMRS associated with a PDCCH and a payload (e.g., a downlink control information (DCI)) of the PDCCH may be multiplexed in resources of the coreset. For example, a DMRS and a PDCCH may be time division multiplexed by a BS transmitting a DMRS, associated with the PDCCH, in a first symbol period of a coreset and the PDCCH in a second symbol period of a core set.

According to aspects of the present disclosure, a DMRS associated with a PDCCH and a payload (e.g., control data) of the PDCCH may be multiplexed in resources of the coreset in one symbol period by splitting a symbol transmitted in the symbol period. For example, a DMRS may be used to generate $N_{DMRS}$ time domain samples, and a PDCCH may be used to generate $N_{PDCCH}$ time domain samples. The $N_{DMRS}$ time domain samples of the DMRS and the $N_{PDCCH}$ time domain samples of the PDCCH may be combined (e.g., concatenated) to make the K time domain samples described above with reference to FIG. 8. Those K time domain samples may then be used to generate a symbol for transmission in a symbol period of a coreset.

In aspects of the present disclosure, a DMRS may be transmitted in a wide band manner over the bandwidth of a coreset.

Figure 11:
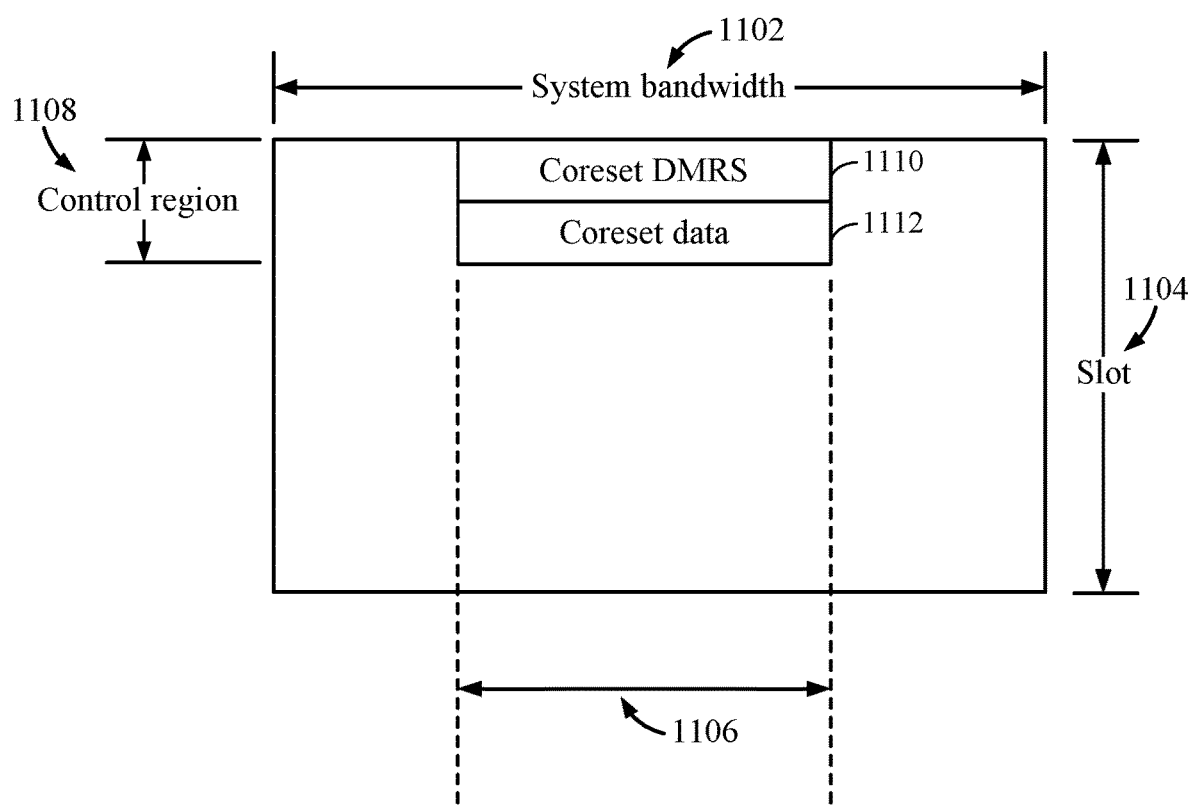
FIG. 11 illustrates an exemplary time frequency resource mapping, in accordance with certain aspects of the present disclosure.

FIG. 11 shows an exemplary time frequency resource mapping 1100, according to aspects of the present disclosure. The exemplary time frequency resource mapping shows an exemplary system bandwidth 1102 during a period of an exemplary slot 1104. An exemplary set of frequency resources, shown at 1106, are defined as a coreset. An exemplary set of time resources, shown at 1108, also define the coreset. The coreset time resources may also be referred to as a control region (see also FIG. 7). In the exemplary coreset, the time resources are divided into two periods (e.g., two symbol periods), with a first period 1110 used for transmitting a DMRS for the coreset and a second period 1112 used for transmitting the coreset data (e.g., DCIs).

According to aspects of the present disclosure, a data portion of a PDCCH (e.g., data transmitted in the coreset data region 1112, shown in FIG. 11) may convey multiple DCIs. The multiple DCIs may be intended for one UE, e.g., conveying both a downlink grant and an uplink grant. Additionally or alternatively, the multiple DCIs may be intended for multiple UEs, for example, multiple DCIs may convey both a downlink grant and an uplink grant to a first UE, two downlink grants to a second UE, and an uplink grant to a third UE.

In aspects of the present disclosure, one or more search spaces (SS) may be defined for each UE, with some time and frequency resources shared between different search spaces. A plurality of UEs may have a common search space (CSS) defined, such that each of the plurality of UEs searches the common search space for control channels (e.g., NR-PDCCHs) to decode. Each UE may also have one or more UE-specific search spaces (UESS) defined, where each of the UEs searches the UE-specific search space(s) defined for that UE.

According to aspects of the present disclosure, a search space may comprise a plurality of decoding candidates, wherein each decoding candidate comprises a set of time and frequency resources that may be decoded as a control channel for a UE. A search space and/or decoding candidates within a search space may be determined based on a hashing function of an identifier of a UE (e.g., a UE ID) for which that search space is defined.

In aspects of the present disclosure and as previously mentioned, an NR-PDCCH transmitted using OFDMA may be transmitted in a distributed manner across frequency resources or transmitted in a manner that is localized in frequency.

According to aspects of the present disclosure, an NR-PDCCH transmitted using a single-carrier waveform may be transmitted in a manner distributed in the time domain (e.g., distributed across time resources) or transmitted in a manner localized in the time domain (e.g., in a set of contiguous time resources).

In aspects of the present disclosure, an NR communications system (e.g., a base station of an NR communications system) may transmit NR-PDCCH using single-carrier waveforms in a manner localized in the time domain, because the short duration of NR-PDCCHs implies there may not be much channel diversity during a transmission, and thus there may be little advantage to transmitting with a distributed mode in the time domain.

According to aspects of the present disclosure, in an NR communication system transmitting NR-PDCCH using OFDMA, a CCE may comprise multiple REGs.

In aspects of the present disclosure, an NR communication system transmitting NR-PDCCH using a single carrier wave form (e.g., DFT-S-FDM) a CCE may comprise a single REG. In other words, in an NR communication system transmitting NR-PDCCH using a single-carrier waveform, CCE and REG may be synonymous terms.

According to aspects of the present disclosure, because single-carrier waveforms already achieve the full frequency diversity in the subband covered by the coreset, there may be little advantage to defining a CCE as comprising multiple REGs, and a CCE may be defined as one REG. Alternatively, a CCE may comprise multiple REGs in a system transmitting using single-carrier waveforms, but the REGs in a CCE may be contiguous REGs.

In aspects of the present disclosure, PDCCH decoding candidates for a UE may comprise different numbers of CCEs for different aggregation levels. For example, an aggregation level 1 PDCCH decoding candidate for a UE may include one control channel element, and an aggregation level 2 PDCCH decoding candidate may include two CCEs.

Figure 12:
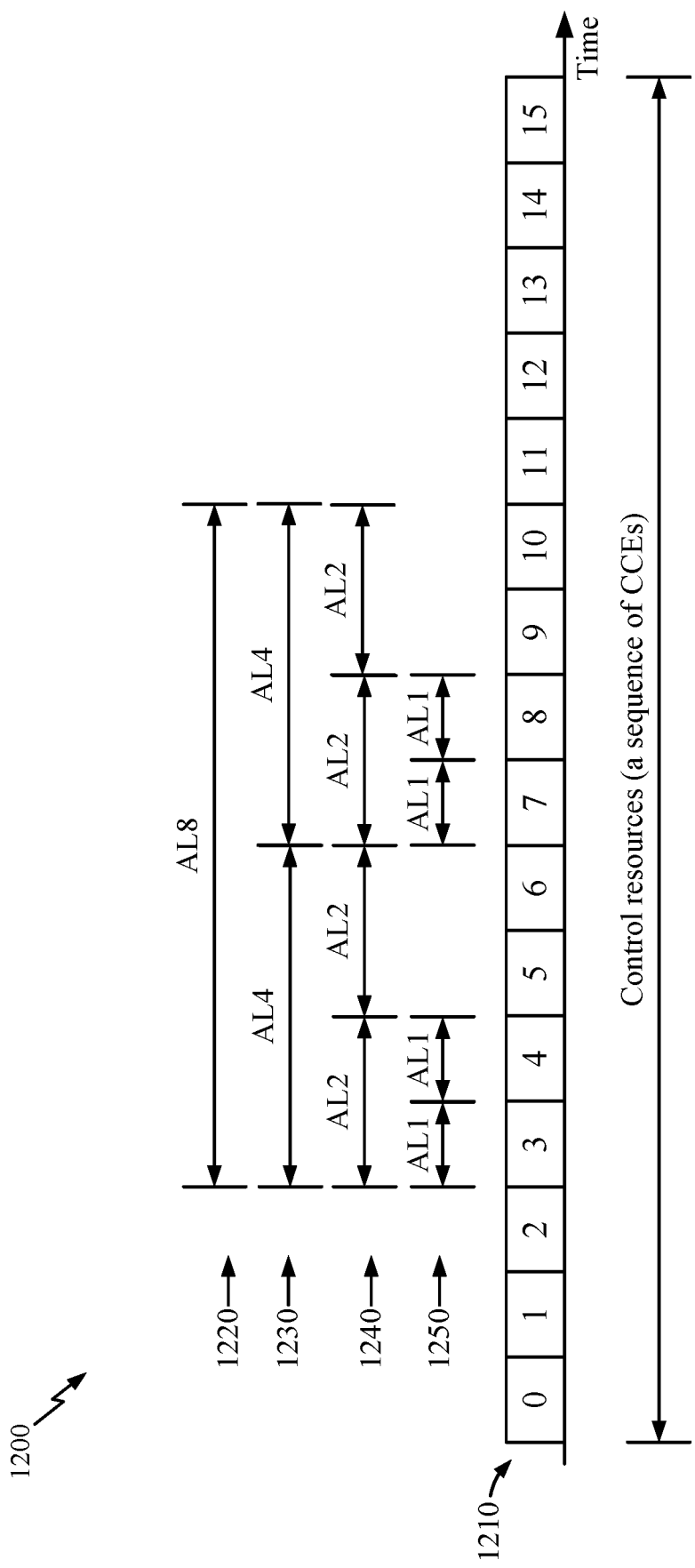
FIG. 12 illustrates an exemplary mapping of control channel elements (CCEs) to decoding candidates, in accordance with certain aspects of the present disclosure.

FIG. 12 illustrates an exemplary mapping 1200 of CCEs to decoding candidates and aggregation levels in a system transmitting NR-PDCCHs using single-carrier waveforms, according to aspects of the present disclosure. A group of control resources (e.g., a sequence of CCEs) are shown at 1210. Each control resource may, for example, represent 100 samples of a signal in a time domain. A group of eight CCEs, representing an aggregation level (AL) eight (AL8) decoding candidate, is shown at 1220. Two groups of four CCEs each, representing two AL four (AL4) decoding candidates, are shown at 1230. Four groups of two CCEs each, representing four AL two (AL2) decoding candidates, are shown at 1240. Four groups of one CCE each, representing four AL one (AL1) decoding candidates, are shown at 1250. Note that each decoding candidate is transmitted in a manner that is localized over the time domain, as previously mentioned above. The time domain localized design may reduce the power consumption of the power amplifier of the transmitter, as the power amplifier can remain powered on and stable at a certain gain stage for a continuous period of time.

According to aspects of the present disclosure, an NR system transmitting NR-PDCCH using single-carrier waveforms may utilize a nested search space concept, where decoding candidates for a given aggregation level are mapped to a same set of CCEs as a next higher aggregation level candidate, as illustrated in FIG. 12. A nested search space concept may reduce the computation complexity of a receiver, as the demodulation operation of time domain samples of different decoding candidates can be reused.

In aspects of the present disclosure, a search space may be defined for use by different UEs. A hashing function of identifiers of the UEs may be used to determine which CCEs in the search space are valid decoding candidates for each of the UEs. The hashing function divides the CCEs from each other over the time domain, rather than over the time and frequency domains, as with systems transmitting PDCCHs using non-single carrier (e.g. OFDMA) wave forms.

According to aspects of the present disclosure, a hashing function may distribute decoding candidates for different UEs over a coreset in a manner that reduces a number of CCEs that are included in decoding candidates for more than one UE. Distributing decoding candidates in that manner may reduce a chance that a PDCCH to a UE at an aggregation level cannot be scheduled because at least one CCE of each decoding candidate of that aggregation level is used for PDCCHs to other UEs. A condition in which a PDCCH to a UE at an aggregation level cannot be scheduled because at least one CCE of each decoding candidate of that aggregation level is used for PDCCHs to other UEs may be referred to as "blocking."

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

For example, means for transmitting, means for processing, and/or means for receiving may comprise one or more of a transmit processor 420, a TX MIMO processor 430, a receive processor 438, or antenna(s) 434 of the base station 110 and/or the transmit processor 464, a TX MIMO processor 466, a receive processor 458, or antenna(s) 452 of the user equipment 120. Additionally, means for generating, means for multiplexing, means for determining, means for processing, and/or means for applying may comprise one or more processors, such as the controller/processor 440 of the base station 110 and/or the controller/processor 480 of the user equipment 120.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for perform the operations described herein and illustrated in FIGS. 9 and 10.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a base station (BS), comprising:
    determining a first control resource set (coreset) of time and frequency resources within a control region of a system bandwidth, to transmit a physical downlink control channel (PDCCH) to a user equipment (UE);
    transmitting the PDCCH to the UE as a discrete Fourier transform spread frequency division multiple access (DFT-S-FDMA) waveform via the first coreset of time and frequency resources; and
    transmitting a demodulation reference signal (DMRS) associated with the PDCCH.

2. The method of claim 1, further comprising:
    configuring a plurality of coresets within the system bandwidth, wherein the first coreset is one of the plurality of coresets.

3. The method of claim 1, further comprising:
    transmitting an indication of resources of the first coreset in at least one of a master information block (MIB) or a radio resource control (RRC) configuration.

4. The method of claim 1, wherein:
    search spaces of different UEs share the first coreset of time and frequency resources;
    a first search space, associated with the UE and within the first coreset, is defined based on a hashing function of an identifier of the UE; and
    transmitting the PDCCH to the UE comprises transmitting the PDCCH in the first search space.

5. The method of claim 1, wherein: transmitting the DMRS comprises transmitting the DMRS within a first symbol period of the control region; and transmitting the PDCCH comprises transmitting data of the PDCCH in a second symbol period of the control region.

6. The method of claim 5, wherein:
    transmitting the data of the PDCCH comprises transmitting at least one downlink control information (DCI) to the UE and zero or more other UEs;
    transmitting the at least one DCI comprises transmitting in one time domain sample of the second symbol period of the control region for each resource element (RE) of each resource element group (REG) of each control channel element (CCE) of one or more CCEs, wherein:
        each DCI is conveyed via one or more CCEs;
        each CCE comprises a fixed number of REGs;
        each REG comprises a fixed number of REs.

7. The method of claim 1, wherein: transmitting the DMRS comprises transmitting the DMRS using bandwidth spanning a bandwidth of the first coreset.

8. A method for wireless communications by a user equipment (UE), comprising:
    determining a first control resource set (coreset) of time and frequency resources within a control region of a system bandwidth, to receive a physical downlink control channel (PDCCH) from a base station (BS);
    receiving the PDCCH as a discrete Fourier transform spread frequency division multiple access (DFT-S-FDMA) waveform via the first coreset of time and frequency resources; and
    processing a demodulation reference signal (DMRS) associated with the PDCCH, wherein receiving the PDCCH comprises receiving the PDCCH based on the processed DMRS.

9. The method of claim 8, wherein determining the first coreset comprises determining the first coreset from a plurality of coresets configured within the system bandwidth.

10. The method of claim 8, wherein:
    determining the resources of the first coreset is based on at least one of a master information block (MIB) or a radio resource control (RRC) configuration.

11. The method of claim 8, wherein:
    search spaces of different UEs share the first coreset of time and frequency resources;
    a first search space, associated with the UE and within the first coreset, is defined based on a hashing function of an identifier of the UE; and receiving the PDCCH comprises receiving the PDCCH in the first search space.

12. The method of claim 8, wherein: processing the DMRS comprises receiving the DMRS within a first symbol period of the control region; and receiving the PDCCH comprises receiving data of the PDCCH in a second symbol period of the control region.

13. The method of claim 12, wherein:
receiving the data of the PDCCH comprises receiving at least one downlink control information (DCI) to the UE;
receiving the at least one DCI comprises receiving in one time domain sample of the second symbol period of the control region for each resource element (RE) of each resource element group (REG) of each control channel element (CCE) of one or more CCEs, wherein:
each DCI is conveyed via one or more CCEs;
each CCE comprises a fixed number of REGs; and
each REG comprises a fixed number of REs.

14. The method of claim 8, wherein: processing the DMRS comprises receiving the DMRS using bandwidth spanning a bandwidth of the first coreset.

15. An apparatus for wireless communications, comprising:
a processor configured to:
determine a first control resource set (coreset) of time and frequency resources within a control region of a system bandwidth, to transmit a physical downlink control channel (PDCCH) to a user equipment (UE); and
cause the apparatus to transmit the PDCCH to the UE as a discrete Fourier transform spread frequency division multiple access (DFT-S-FDMA) waveform via the first coreset of time and frequency resources; and
a memory coupled with the processor; and
wherein the processor is further configured to:
cause the apparatus to transmit a demodulation reference signal (DMRS) associated with the PDCCH.

16. The apparatus of claim 15, wherein the processor is further configured to:
configure a plurality of coresets within the system bandwidth, wherein the first coreset is one of the plurality of coresets.

17. The apparatus of claim 15, wherein the processor is further configured to:
cause the apparatus to transmit an indication of resources of the first coreset in at least one of a master information block (MIB) or a radio resource control (RRC) configuration.

18. The apparatus of claim 15, wherein:
search spaces of different UEs share the first coreset of time and frequency resources;
a first search space, associated with the UE and within the first coreset, is defined based on a hashing function of an identifier of the UE; and
the processor is configured to cause the apparatus to transmit the PDCCH to the UE by causing the apparatus to transmit the PDCCH in the first search space.

19. The apparatus of claim 15, wherein the processor is configured to: cause the apparatus to transmit the DMRS by causing the apparatus to transmit the DMRS within a first symbol period of the control region; and cause the apparatus to transmit the PDCCH by causing the apparatus to transmit data of the PDCCH in a second symbol period of the control region.

20. The apparatus of claim 19, wherein:
the processor is configured to cause the apparatus to transmit the data of the PDCCH by causing the apparatus to transmit at least one downlink control information (DCI) to the UE and zero or more other UEs;
the processor is configured to cause the apparatus to transmit the at least one DCI by causing the apparatus to transmit in one time domain sample of the second symbol period of the control region for each resource element (RE) of each resource element group (REG) of each control channel element (CCE) of one or more CCEs, wherein:
each DCI is conveyed via one or more CCEs;
each CCE comprises a fixed number of REGs;
each REG comprises a fixed number of REs.

21. The apparatus of claim 15, wherein the processor is configured to: cause the apparatus to transmit the DMRS by causing the apparatus to transmit the DMRS using bandwidth spanning a bandwidth of the first coreset.

22. An apparatus for wireless communications, comprising:
a processor configured to:
determine a first control resource set (coreset) of time and frequency resources within a control region of a system bandwidth, to receive a physical downlink control channel (PDCCH) from a base station (BS); and
cause the apparatus to receive the PDCCH as a discrete Fourier transform spread frequency division multiple access (DFT-S-FDMA) waveform via the first coreset of time and frequency resources; and
a memory coupled with the processor; and
wherein the processor is further configured to:
process a demodulation reference signal (DMRS) associated with the PDCCH, wherein causing the apparatus to receive the PDCCH comprises causing the apparatus to receive the PDCCH based on the processed DMRS.

23. The apparatus of claim 22, wherein the processor is configured to determine the first coreset by determining the first coreset from a plurality of coresets configured within the system bandwidth.

24. The apparatus of claim 22, wherein:
the processor is configured to cause the apparatus to receive at least one of a master information block (MIB) or a radio resource control (RRC) configuration; and
the processor is configured to determine the resources of the first coreset based on the at least one MIB or RRC configuration.

25. The apparatus of claim 22, wherein:
search spaces of different UEs share the first coreset of time and frequency resources;
a first search space, associated with the apparatus and within the first coreset, is defined based on a hashing function of an identifier of the apparatus; and
the processor is configured to cause the apparatus to receive the PDCCH by causing the apparatus to receive the PDCCH in the first search space.

26. The apparatus of claim 22, wherein the processor is configured to: process the DMRS by causing the apparatus to receive the DMRS within a first symbol period of the control region; and cause the apparatus to receive the PDCCH by causing the apparatus to receive data of the PDCCH in a second symbol period of the control region.

27. The apparatus of claim 26, wherein the processor is configured to:

cause the apparatus to receive the data of the PDCCH by causing the apparatus to receive at least one downlink control information (DCI) to the apparatus;

cause the apparatus to receive the at least one DCI by causing the apparatus to receive in one time domain sample of the second symbol period of the control region for each resource element (RE) of each resource element group (REG) of each control channel element (CCE) of one or more CCEs, wherein:

each DCI is conveyed via one or more CCEs;
each CCE comprises a fixed number of REGs; and
each REG comprises a fixed number of REs.

28. The apparatus of claim 22, wherein the processor is configured to: process the DMRS by causing the apparatus to receive the DMRS using bandwidth spanning a bandwidth of the first coreset.

* * * * *